(12) United States Patent
Lewis

(10) Patent No.: US 10,771,603 B2
(45) Date of Patent: Sep. 8, 2020

(54) PORTABLE DEVICE ACCESSORY

(71) Applicant: Ryan Carson Lewis, Atlanta, GA (US)

(72) Inventor: Ryan Carson Lewis, Atlanta, GA (US)

(*) Notice: Subject to any disclaimer, the term of this patent is extended or adjusted under 35 U.S.C. 154(b) by 0 days.

(21) Appl. No.: 16/694,572

(22) Filed: Nov. 25, 2019

(65) Prior Publication Data
US 2020/0099779 A1 Mar. 26, 2020

Related U.S. Application Data

(63) Continuation-in-part of application No. 16/582,984, filed on Sep. 25, 2019.

(60) Provisional application No. 62/735,956, filed on Sep. 25, 2018.

(51) Int. Cl.
H04M 1/04 (2006.01)
F16M 11/04 (2006.01)
F16M 13/02 (2006.01)
G06F 1/16 (2006.01)

(52) U.S. Cl.
CPC ............ *H04M 1/04* (2013.01); *F16M 11/041* (2013.01); *F16M 13/022* (2013.01); *G06F 1/1626* (2013.01)

(58) Field of Classification Search
CPC . H04N 5/2253; A45F 5/10; A45F 2200/0525; A45F 2200/0516; H04M 1/04; G06F 1/1626
See application file for complete search history.

(56) References Cited

U.S. PATENT DOCUMENTS

| 8,560,031 | B2 | 10/2013 | Barnett et al. | |
| 9,243,739 | B2* | 1/2016 | Peters | F16M 13/00 |
| 9,850,926 | B2* | 12/2017 | Buchanan | F16B 2/22 |
| 10,550,992 | B2* | 2/2020 | Yun | F16M 13/00 |
| 2013/0181584 | A1* | 7/2013 | Whitten | F16B 3/00 312/223.1 |
| 2013/0318775 | A1* | 12/2013 | Peters | A45F 5/00 29/592.1 |
| 2014/0317329 | A1 | 10/2014 | Barnett et al. | |
| 2018/0051846 | A1* | 2/2018 | Hobbs | F16M 11/06 |
| 2019/0009850 | A1* | 1/2019 | Peters | B62J 11/00 |
| 2019/0154190 | A1* | 5/2019 | Yun | F16M 13/00 |

* cited by examiner

Primary Examiner — Lewis G West

(57) ABSTRACT

The present invention is a portable device accessory that includes a cover, a plurality of hooks, a connector, a first adhesive pad, a plurality of protrusions, and a second adhesive pad. The first adhesive pad is attached to one side of the connector. The other side of the connector is attached to a portable device, such as mobile phone, by the second adhesive pad. The user may remove the cover to reveal the first adhesive pad, then temporarily attaches the first adhesive pad to a mounting surface so the user may take a selfie or record video with the portable device. After the user detaches the first adhesive pad, the user may place the cover over the first adhesive pad, then turn the cover so the plurality of hooks on the cover can engage and lock with the plurality of protrusions on the connector.

8 Claims, 11 Drawing Sheets

PORTABLE DEVICE ACCESSORY

The current application is a continuation-in-part (CIP) application of a U.S. non-provisional application Ser. No. 16/582,984 filed on Sep. 25, 2019. The U.S. non-provisional application Ser. No. 16/582,984 claims a priority to a U.S. provisional application Ser. No. 62/735,956 filed on Sep. 25, 2018.

FIELD OF THE INVENTION

The present invention generally relates to an incrementally-sizeable grip/stand accessory known as popsocket grip. More specifically, the present invention is an accessory attachment for popsocket grip so that the user may mount a portable electronic device to different mounting surfaces or position the portable electronic device to perform different functions like taking picture or video.

BACKGROUND OF THE INVENTION

Portable devices such as cellular phone or tablet are carried by most people on daily, or even hourly basis because they are very convenient to carry around and powerful enough for the users to complete many tasks. Most people cannot even leave home without carrying a portable device, due to massive amounts of social network interactions accessible from portable devices. For example, many users take a selfie or other pictures to post on Facebook, Instagram, twitter, or other websites with portable devices. However, issues arise because most portable devices do not have any attaching mechanism to enable to user to attach the portable device to another surface. While selfie stick does exist, this issue remained unsolved, because the selfie stick cannot cover all the different angles, and has limited flexibility, since the user must use one hand to hold the selfie stick, and the selfie stick only extends to a certain length.

The present invention provides a solution to all above-mentioned issues by providing an accessory attachment, which allow the user to quickly attach and detach the portable electronic device to various mounting surfaces. The present invention can be attached to an accessory on the portable electronic device known as popsocket grip. Then, the user may attach the present invention along with the portable electronic device to various mounting surfaces to take a picture, a video clip, or just perform other functions such as playing music or video. The present invention is both small and flexible, so it does not occupy too much space when attaching to the portable device. Moreover, the present invention is flexible enough to attach to different portable electronic devices or accessories to expand the functions of portable electronic devices. This invention strives to be a universal mount for our portable electronic devices to enable us to use have full use of these devices hands-free wherever we go.

DETAIL DESCRIPTIONS OF THE INVENTION

All illustrations of the drawings are for the purpose of describing selected versions of the present invention and are not intended to limit the scope of the present invention.

The present invention is a portable device accessory that allows the user to temporarily attach portable electronic devices such as mobile phones or tables to different mounting surfaces to take pictures or videos. More specifically, the present invention can be attached to an incrementally-sizeable grip/stand accessory, also known as popsocket grip, so that the portable electronic devices can be attached to different mounting surfaces.

Figure 1:
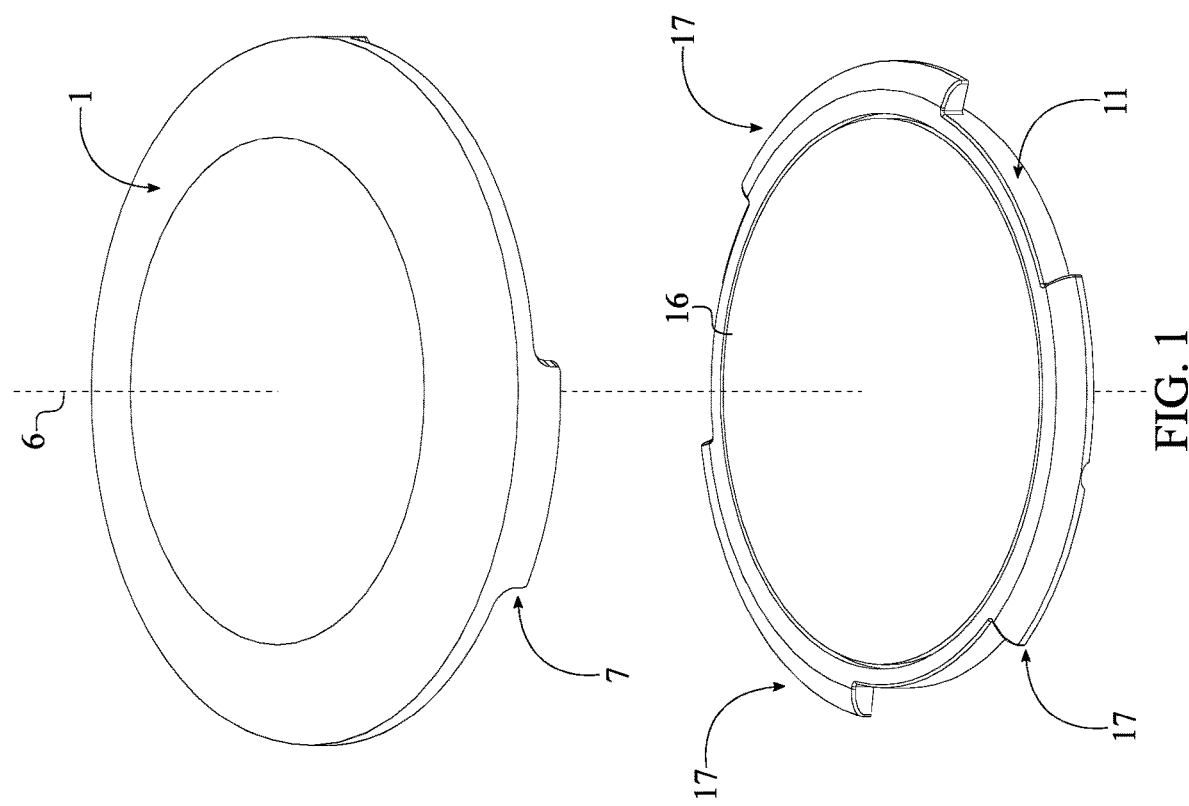
FIG. 1 is a top perspective exploded view of the present invention.
Figure 2:
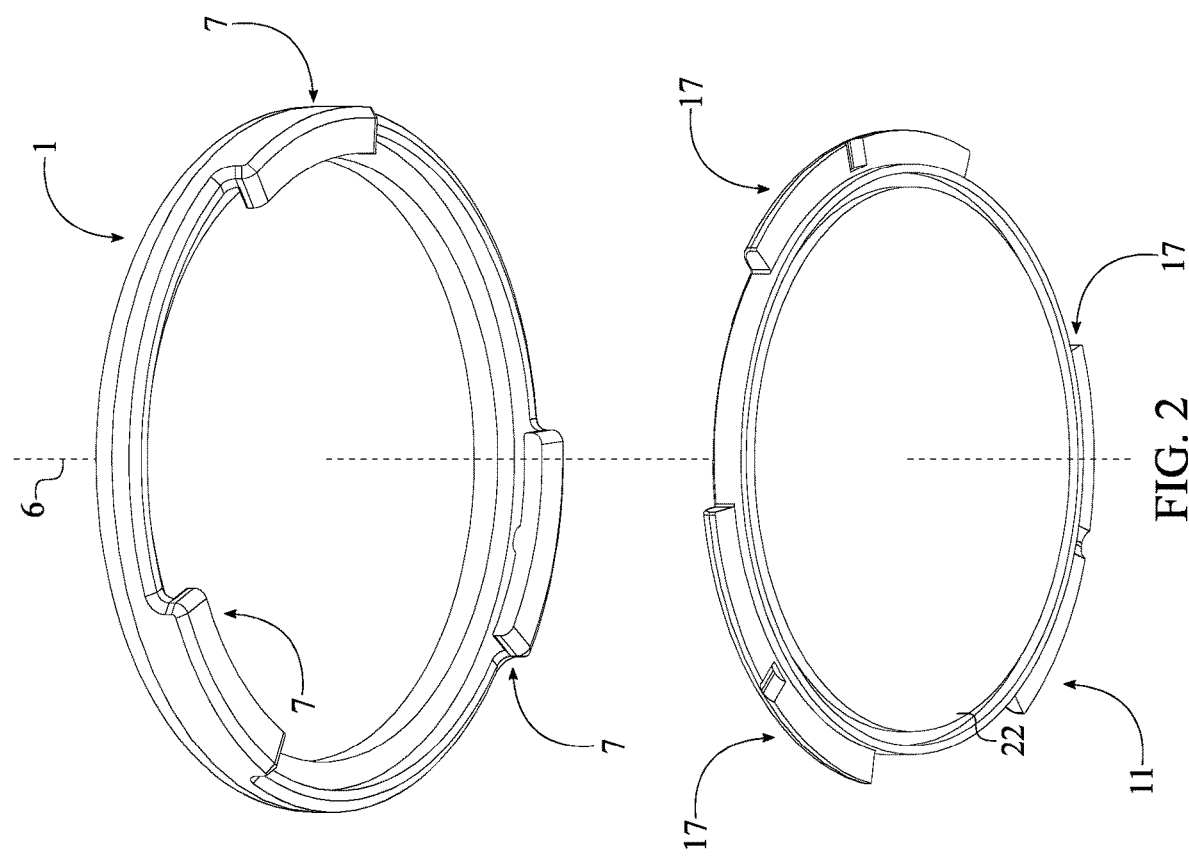
FIG. 2 is a bottom perspective exploded view of the present invention.

In reference to FIG. 1-2, the present invention comprises a cover 1, a plurality of hooks 7, a connector 11, a first adhesive pad 16, a plurality of protrusions 17, and a second adhesive pad 22. The cover 1 is configured to prevent dust or other objects from contacting the first adhesive pad 16. The plurality of hooks 7 is radially distributed on the cover 1 and adjacently connected to the cover 1. The plurality of hooks 7 is configured to attach the cover 1 to the connector 11 when the user wishes to cover or seal the first adhesive pad 16. The plurality of protrusions 17 is a type of locking mechanism that is configured to engage with the plurality of hooks 7 to lock/attach the cover 1 onto the connector 11 thus enclosing the entire first adhesive pad 16. The plurality of protrusions 17 is externally connected to the connector 11 and also radially distributed around the connector 11. This configuration allows the cover 1 to encircle around the connector 11 so that the first adhesive pad 16 can be evenly enclosed by the cover 1. Furthermore, the cover 1 is prevented from falling off from the connector 11 by accident or other impacts. In other words, the connector 11 and the cover 1 are attached to each other by the plurality of hooks 7 and the plurality of protrusions 17.

In reference to FIGS. 1 and 2, the first adhesive pad 16 is positioned between the cover 1 and the connector 11 so that the first adhesive pad 16 can be selectively enclosed or opened by the cover 1. The first adhesive pad 16 is terminally connected to the connector 11 as the first adhesive pad 16 is configured to temporarily attach the connector 11 to the mounting surface. The second adhesive pad 22 is also terminally connected to the connector 11; however, the first adhesive pad 16 and the second adhesive pad 22 are concentrically positioned opposite of each other about the connector 11. The second adhesive pad 22 is utilized to temporarily attach the present invention to the popsocket grip, wherein the first adhesive pad 16 and the second adhesive pad 22 complete the bridge between the mounting surface and the portable electronic devices.

Figure 3:
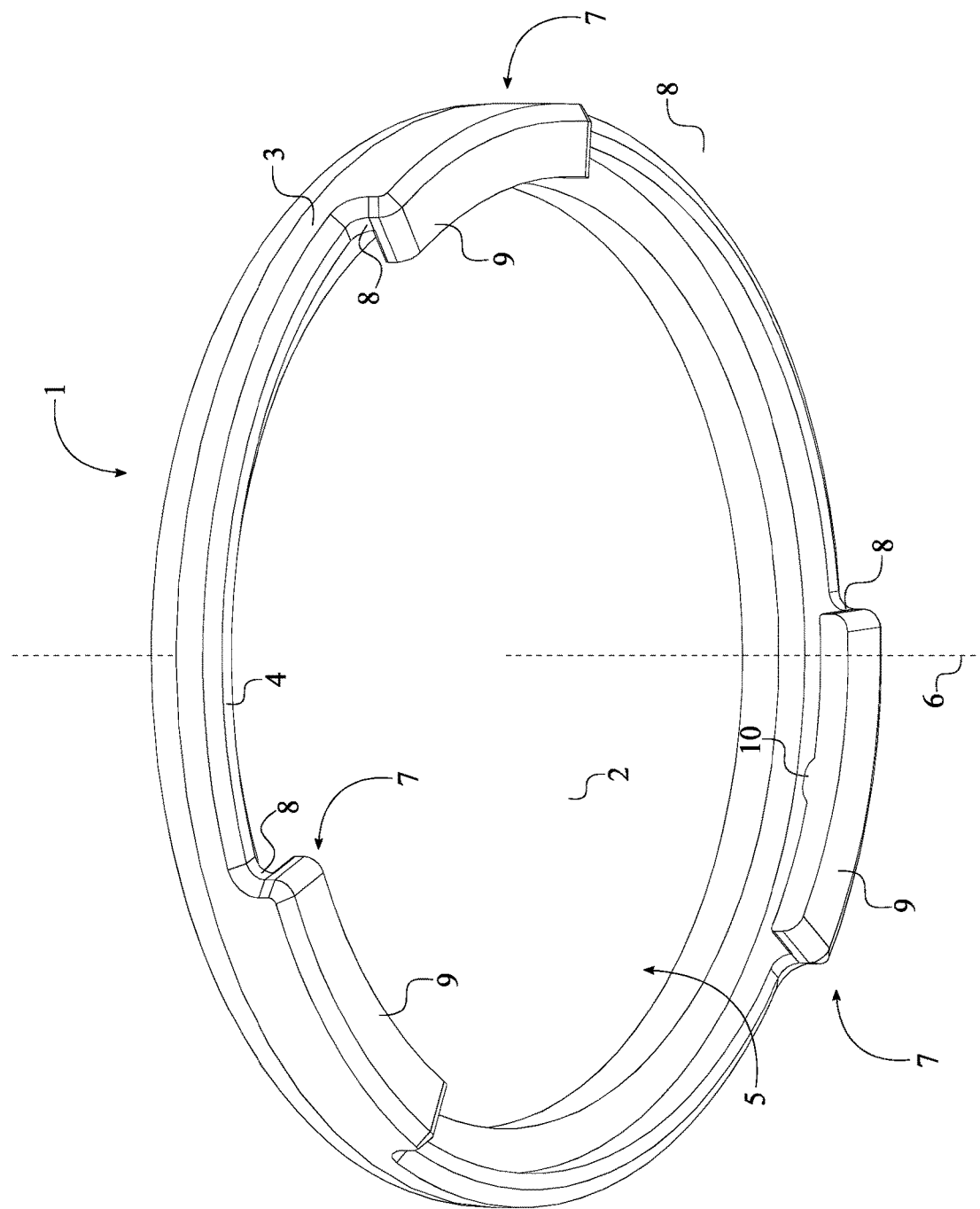
FIG. 3 is a bottom perspective view of the cover.
Figure 4:
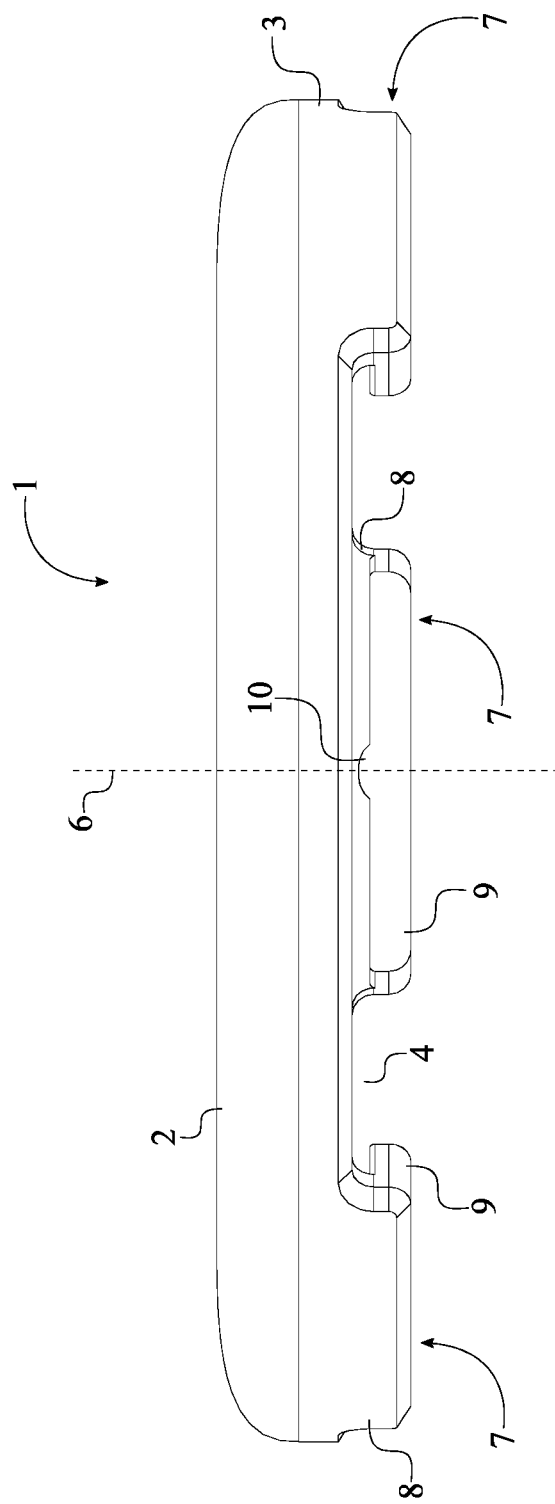
FIG. 4 is a side view of the cover.

In reference to FIG. 3-4, the cover 1 comprises a first base 2, an annular flange 3, a first edge 4, a first opening 5, and a central axis 6. The first base 2 is configured to cover the entire first adhesive pad 16 and also functions as a foundation body to hold other components of the cover 1. The annular flange 3 and the first base 2 are concentrically positioned to along the central axis 6. The annular flange 3 is configured to surround the side of the first adhesive pad 16 and preventing dust or other items from contacting the first adhesive pad 16 from the side. The first opening 5 is delineated by the annular flange 3 and the first base 2, wherein the first opening 5 is configured to receive the first adhesive pad 16. The first edge 4 is concentrically positioned around the central axis 6. The first edge 4 and the first base 2 are oppositely positioned of each other about the annular flange 3. The first edge 4 is configured to encircled around the outermost surface of the connector 11 to prevent dust or other unwanted objects from contacting or entering into the first adhesive pad 16.

The cover 1 also provides an additional important function outside of protecting the first adhesive pad 16. More specifically, an outside face of the cover 1 provides an empty surface area for different images and logos to be printed on the present invention for promotional use. The ability of the cover 1 to be completely detached from the connector 11 allows the cover 1 to be used as a physical key that can be scanned via QR code or similar technology with their respective camera to access any desired webpage, content, digital community, etc.

Figure 10:
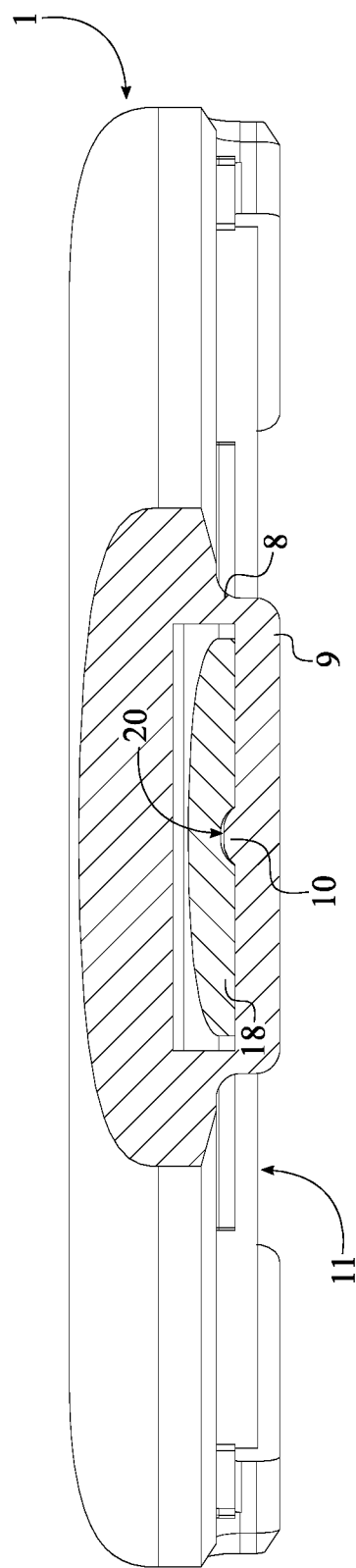
FIG. 10 is a cross section view of the present invention taken along line A-A of FIG. 9.

In reference to FIG. 3 and FIG. 10, each of the plurality of hooks 7 comprises a first leg 8, a second leg 9, and at least one first protrusion 10. The first leg 8 is perimetrically connected along the first edge 4. The first leg 8 is configured to extend the plurality of hooks 7 and allows the plurality of hooks 7 to properly engage with the plurality of protrusions 17. The second leg 9 is angularly connected to the first leg 8. The second leg 9 is oriented toward the first opening 5. In other words, the second leg 9 is extending toward the central axis 6 of the cover 1. Since the cover 1 is designed to be slightly larger than the connector 11 to fully enclose the entire first adhesive pad 16, the second leg 9 extends toward the center of the cover 1 to engage the plurality of protrusions 17. The at least one first protrusion 10 is connected onto the second leg 9 so that each second leg 9 of the plurality of hooks 7 may engage with a corresponding protrusions from the plurality of protrusions 17. The at least one first protrusion 10 is oriented toward the first base 2. The at least one first protrusion 10 is configured to directly engage with the corresponding protrusions from the plurality of protrusions 17 and lock the cover 1 to the connector 11.

The connector 11 is configured as the base member for the first adhesive pad 16 and the second adhesive pad 22 to attach with the portable electronic devices or other relevant accessories and the mounting surface. In reference to FIG. 5-8, the connector 11 comprises a second base 12, a lateral wall 13, a top edge 23, a top opening 24, a bottom edge 14, and a bottom opening 15. More specifically, the top edge 23 and the bottom edge 14 are concentrically positioned around the lateral wall 13 and oppositely positioned of each other about the lateral wall 13 thus delineating the upper and lower edges. The lateral wall 13 is concentrically connected around the second base 12. The lateral wall 13 is radially configured so that the outer edges of the first adhesive pad 16 and the second adhesive pad 22 can be protected within the present invention. The second base 12 is positioned in between the top edge 23 and the bottom edge 14 in order to delineate two different cavities to place the both the first adhesive pad 16 and the second adhesive pad 22. In other words, the top opening 24 is delineated by the top edge 23 and the second base 12, and the bottom opening 15 is delineated by the bottom edge 14 and the second base 12.

Figure 5:
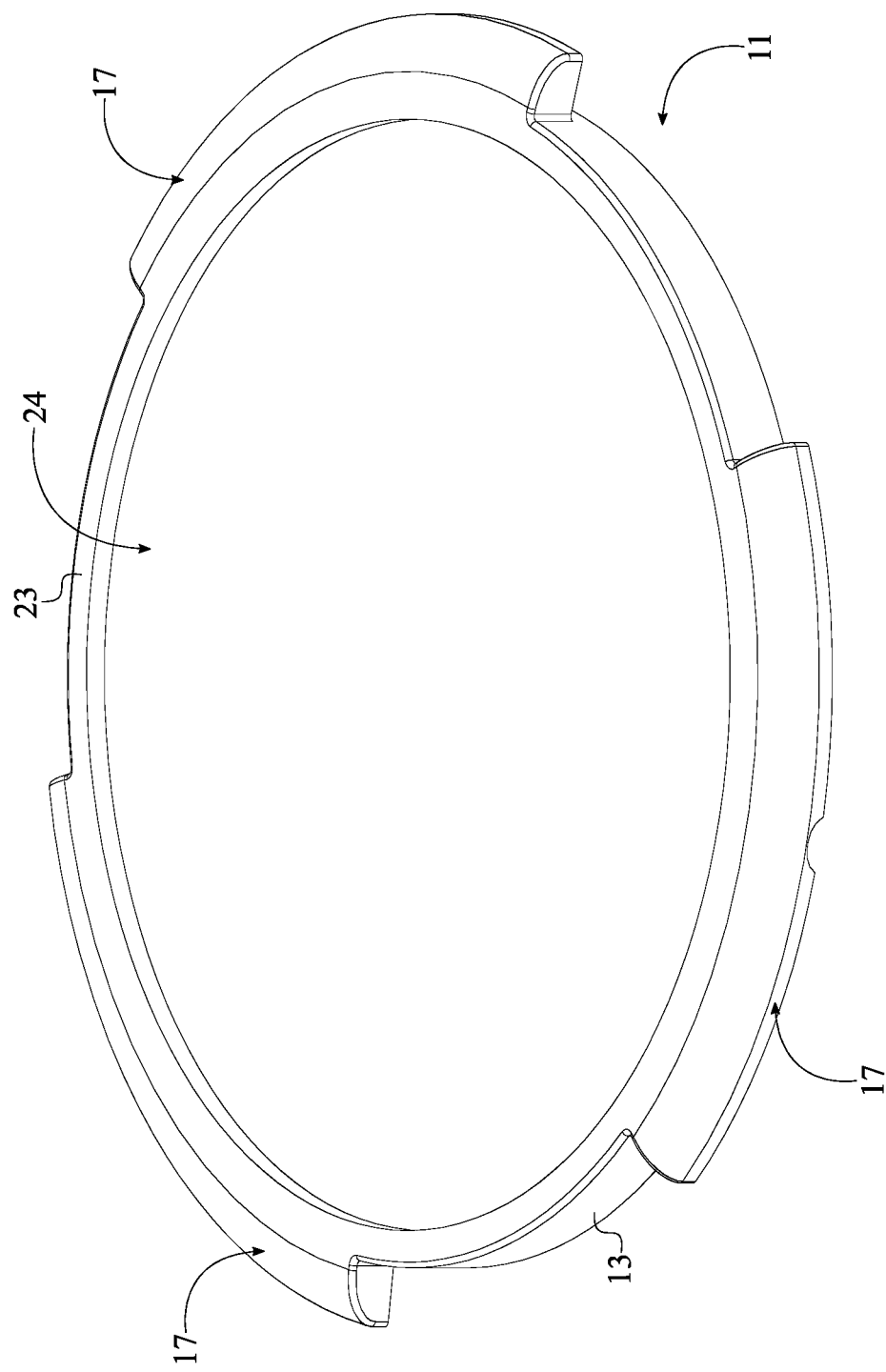
FIG. 5 is a top perspective view of the connector without the first adhesive pad and showing the top opening.
Figure 6:
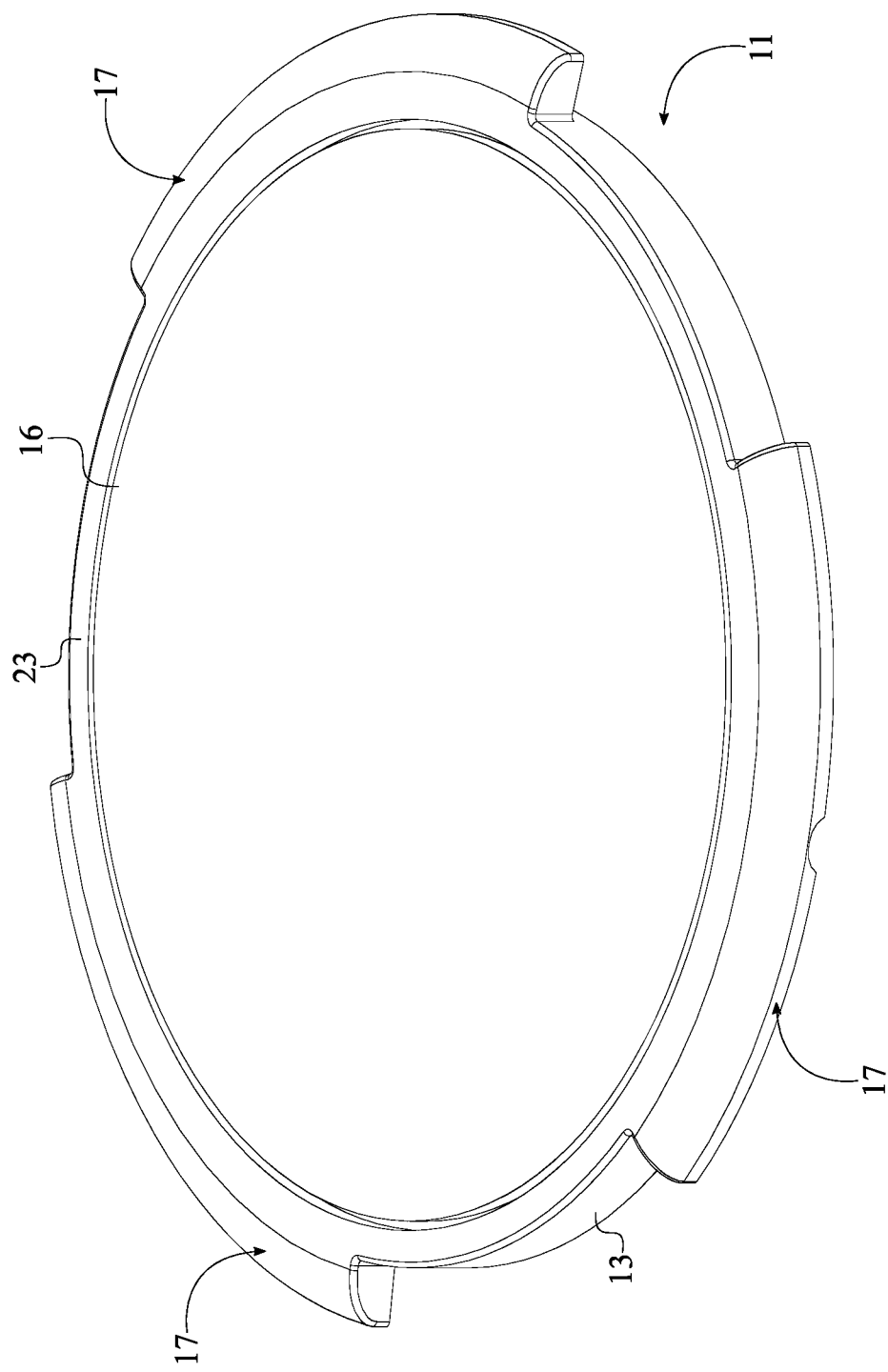
FIG. 6 is a top perspective view of the connector with the first adhesive pad.

In reference to FIG. 5-6, the first adhesive pad 16 is concentrically positioned about the top edge 23 and positioned within the top opening 24. Resultantly, the first adhesive pad 16 is superimposed onto the second base 12 via the top opening 24 so that the first adhesive pad 16 can temporarily attach to the mounting surface thus securing the present invention from one end.

Figure 7:
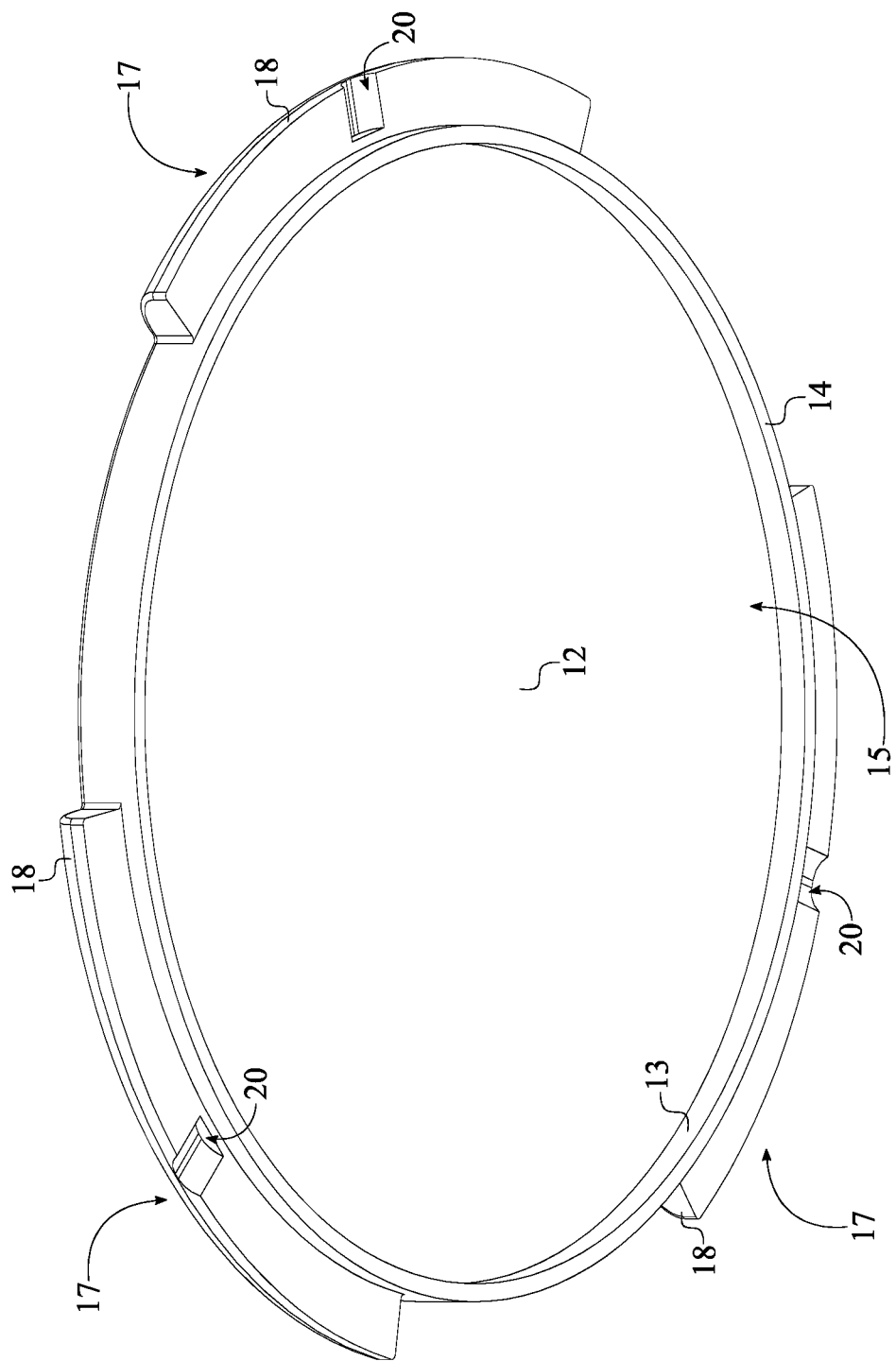
FIG. 7 is a bottom perspective view of the connector without the second adhesive pad and showing the bottom opening.
Figure 8:
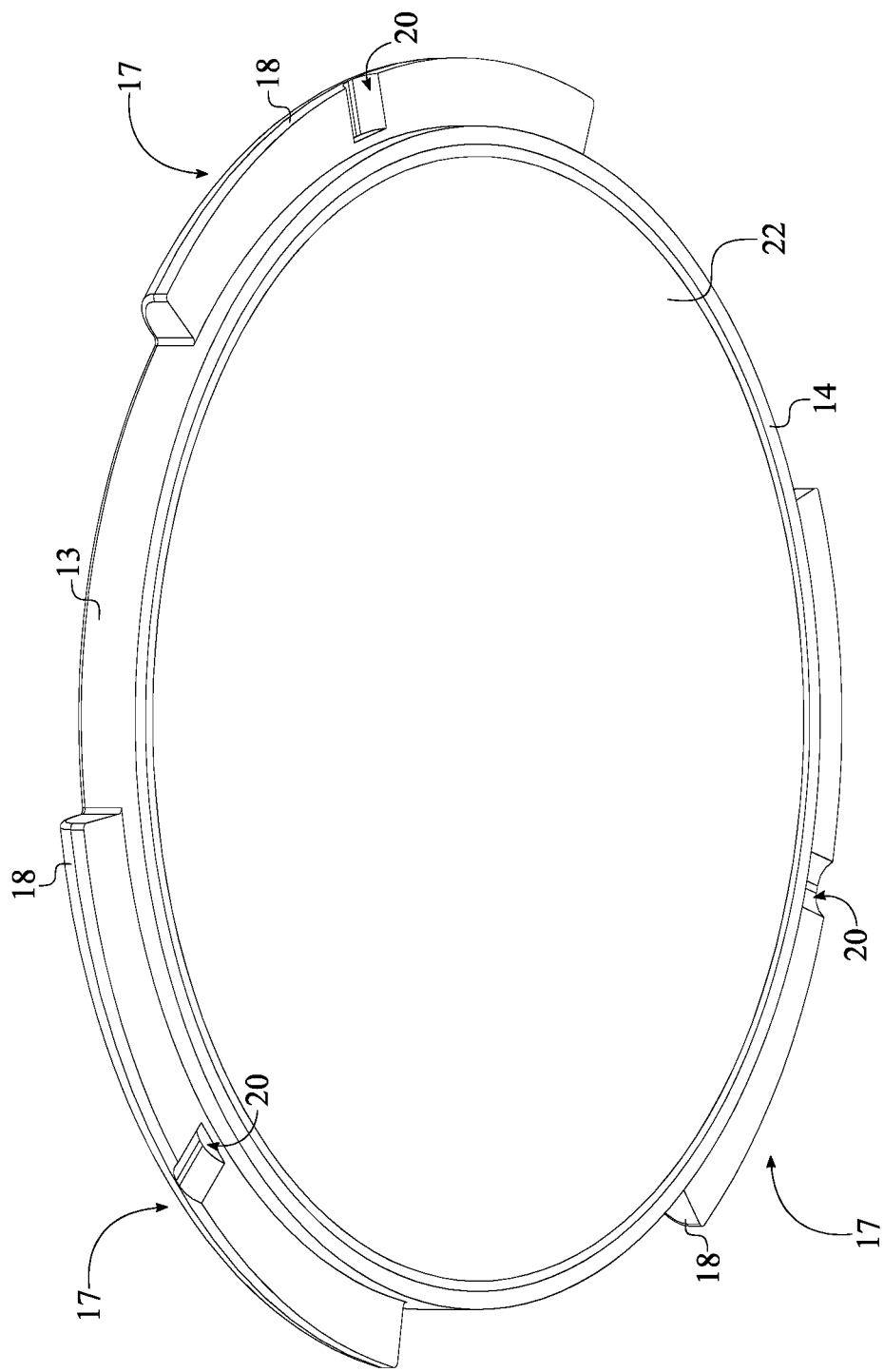
FIG. 8 is a bottom perspective view of the connector with the second adhesive pad.

In reference to FIG. 7-8, the second adhesive pad 22 is concentrically positioned about the bottom edge 14 and positioned within the bottom opening 15. Resultantly, the second adhesive pad 22 is superimposed onto the second base 12 via the bottom opening 15 so that the second adhesive pad 22 can temporarily attach to certain accessories, such as the popsocket grip, thus securing the present invention from opposite end.

In a preferred embodiment of the present invention as shown in FIG. 8, each of the plurality of protrusions 17 preferably comprises a structural body 18 and at least one locking divot 20. The structural body 18 is configured as a base to introduce at least one locking divot 20. The structural body 18 is externally connected around the lateral wall 13 to keep the space inside of the lateral wall 13 unoccupied. In other words, external positioning of the structural body 18 does not interfere with the configuration of the top opening 24 and the bottom opening 15. The structural body 18 is positioned adjacent to the top edge 23. The structural body 18 is radially distributed around the second base 12 to ensure the plurality of hooks 7 of the cover 1 evenly engages the plurality of protrusions 17 so that the first adhesive pad 16 can be fully enclosed by the cover 1. The at least one locking divot 20 traverses into the structural body 18 and oriented toward the top edge 23. As the user places the entire cover 1 over the first adhesive pad 16, the user may turn the cover 1 so the at least one first protrusion 10 of the plurality of hooks 7 can engage and lock with the at least one locking divot 20 of the plurality of protrusions 17.

Figure 11:
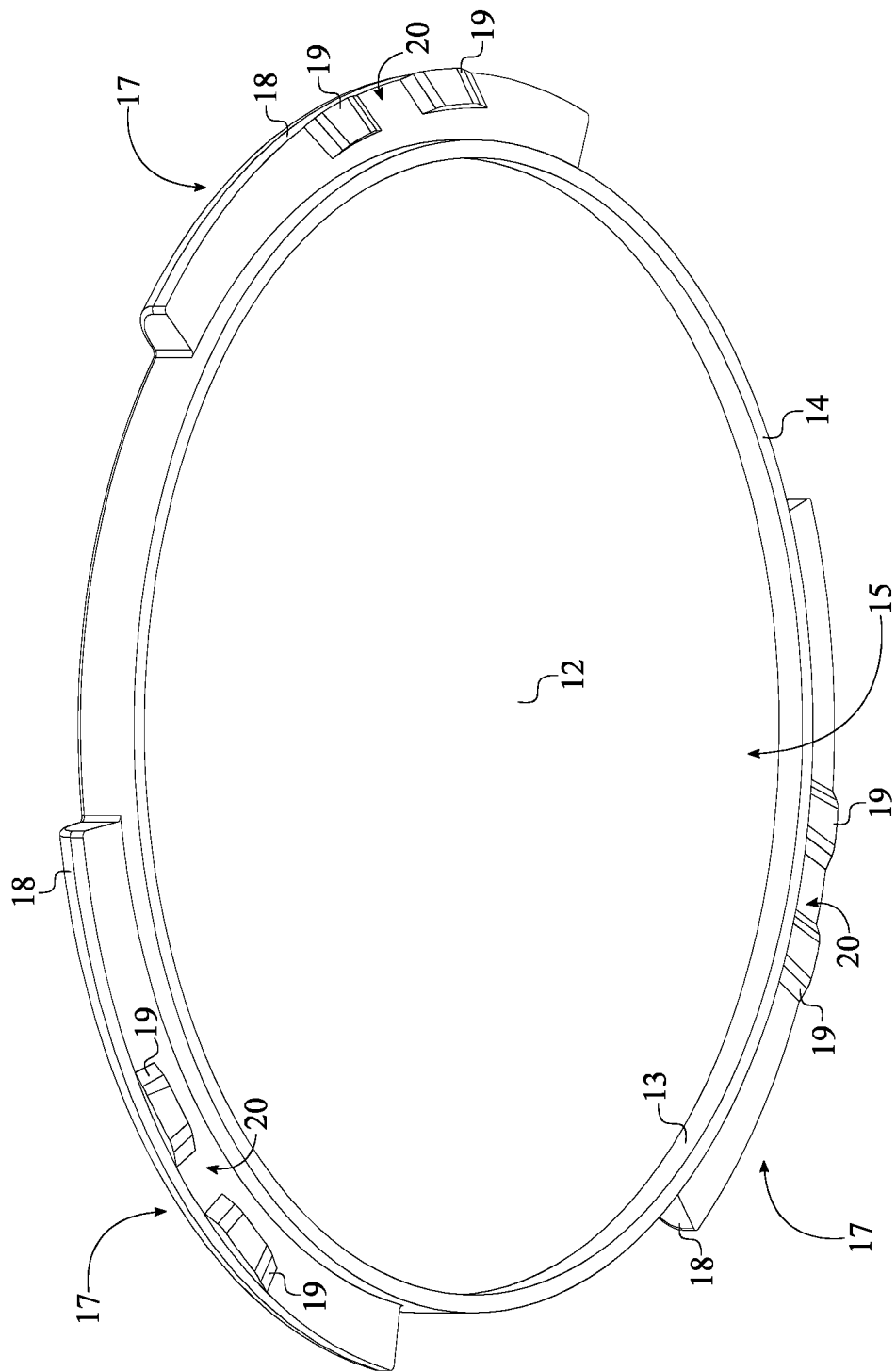
FIG. 11 is a bottom perspective view for the connector of the alternative embodiment of the present invention showing the plurality of second protrusions.

In an alternative embodiment of the present invention as shown in FIG. 11, each of the plurality of protrusions 17 can comprise a plurality of second protrusions 19 in addition the at least one locking divot 20 and the structural body 18. The structural body 18 is externally connected around the lateral wall 13 to keep the space inside of the lateral wall 13 unoccupied. In other words, external positioning of the structural body 18 does not interfere with the configuration of the top opening 24 and the bottom opening 15. The structural body 18 is positioned adjacent to the top edge 23. The structural body 18 is radially distributed around the second base 12 to ensure the plurality of hooks 7 of the cover 1 evenly engages the plurality of protrusions 17 so the first adhesive pad 16 can be fully covered by the cover 1. The plurality of second protrusions 19 is connected along the structural body 18. The at least one locking divot 20 is positioned between the plurality of second protrusions 19. As the user places the entire cover 1 over the first adhesive pad 16, the user may turn the cover 1 so the at least one first protrusion 10 of the plurality of hooks 7 can engage and lock with the at least one locking divot 20 of the plurality of protrusions 17. The plurality of second protrusions 19 is oriented toward the bottom edge 14. This configuration ensures the plurality of second protrusions 19 engages with the plurality of first protrusion 10 when the user is covering the first adhesive pad 16 with the cover 1.

Figure 9:
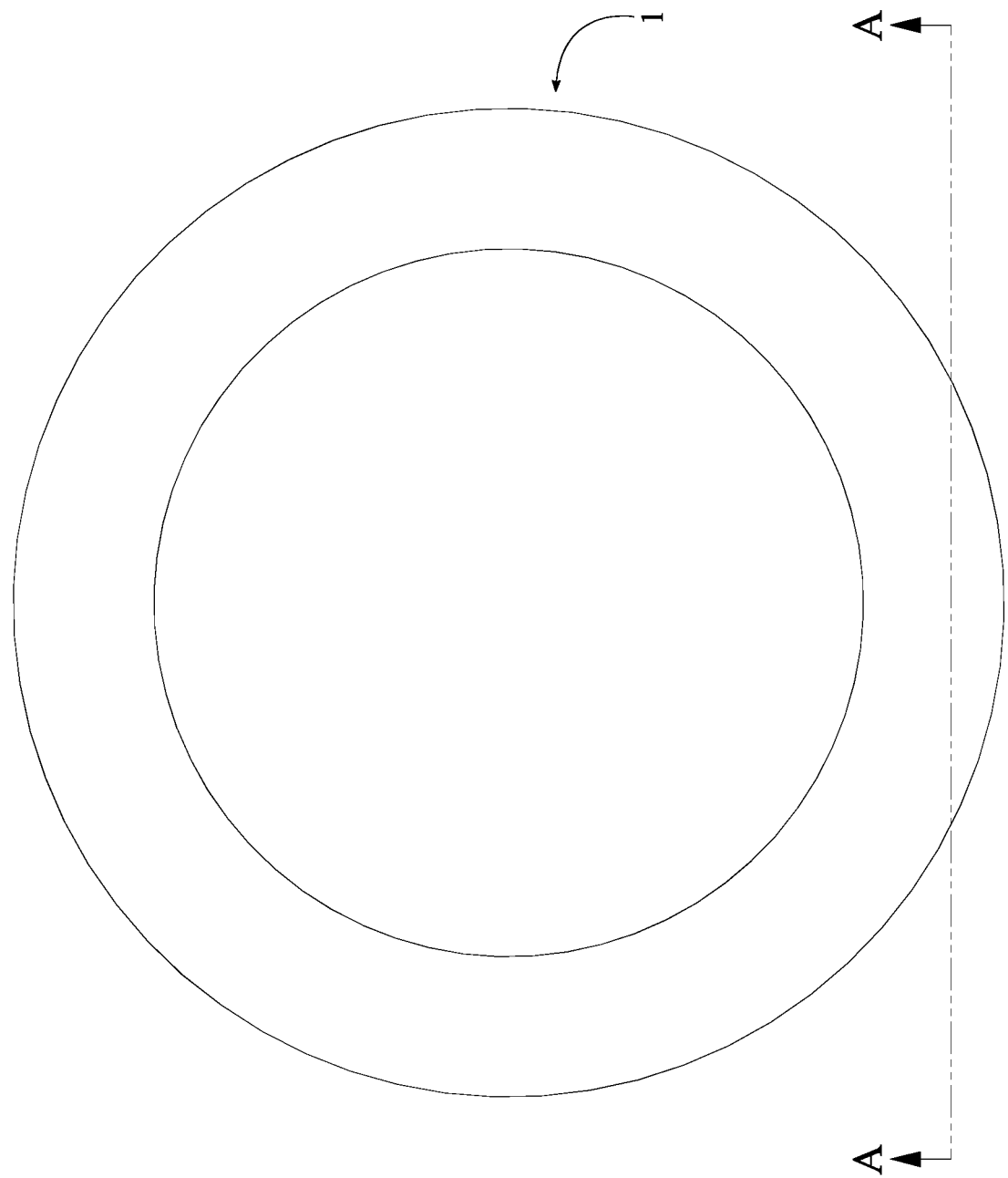
FIG. 9 is a top view of the cover, showing the plane upon which a cross section view is taken shown in FIG. 10.

In reference to FIG. 9-10, each of the plurality of hooks 7 comprises the at least one first protrusion 10. Each of the plurality of protrusions 17 comprises the at least one locking divot 20. The at least one locking divot 20 and the at least one first protrusion 10 are slidably engaged with each other. As the user places the cover 1 over the entire first adhesive pad 16, the user may turn the cover 1 so each of the plurality of first protrusion 10 engages with the at least one locking divot 20 and locks the cover 1 to the connector 11.

Although the invention has been explained in relation to its preferred embodiment, it is to be understood that many other possible modifications and variations can be made without departing from the spirit and scope of the invention as hereinafter claimed.

What is claimed is:

1. A portable device accessory comprising:
    a cover;
    a plurality of hooks;
    a connector;
    a first adhesive pad;
    a plurality of protrusions;
    a second adhesive pad;
    the plurality of hooks being adjacently connected to the cover;
    the plurality of hooks being radially distributed around the cover;
    the plurality of protrusions being externally connected to the connector;
    the plurality of protrusions being radially distributed around the connector;
    the first adhesive pad being positioned between the cover and the connector;
    the first adhesive pad and the second adhesive pad being concentrically positioned opposite of each other about the connector;
    the first adhesive pad being terminally connected to the connector;
    the second adhesive pad being terminally connected to the connector;
    the first adhesive pad being enclosed by the cover; and
    the connector and the cover being attached to each other by the plurality of hooks and the plurality of protrusions.

2. The portable device accessory as claimed in claim 1 comprising:
    the cover comprising a first base, an annular flange, a first edge, a first opening, and a central axis;
    the annular flange and the first base being concentrically positioned along the central axis;
    the first opening being delineated by the annular flange and the first base;
    the first edge being concentrically positioned around the central axis; and
    the first edge and the first base being oppositely positioned of each other about the annular flange.

3. The portable device accessory as claimed in claim 1 comprising:
    the cover comprising a first base, a first edge, and a first opening;
    each of the plurality of hooks comprising a first leg, a second leg, and at least one first protrusion;
    the first leg being perimetrically connected along the first edge;
    the first leg being perpendicularly positioned to the first base;
    the second leg being angularly connected to the first leg;
    the second leg being oriented toward the first opening;
    the at least one first protrusion being connected onto the second leg; and
    the at least one first protrusion being oriented toward the first base.

4. The portable device accessory as claimed in claim 1 comprising:
    the connector comprising a second base, a lateral wall, a top edge, a top opening, a bottom edge, and a bottom opening;
    the top edge and the bottom edge being concentrically positioned around the lateral wall;
    the top edge and the bottom edge being oppositely positioned of each other about the lateral wall;
    the lateral wall being concentrically connected around the second base;
    the second base being positioned in between the top edge and the bottom edge;
    the top opening being delineated by the top edge and the second base; and
    the bottom opening being delineated by the bottom edge and the second base.

5. The portable device accessory as claimed in claim 4 comprising:
    the first adhesive pad being concentrically positioned about the top edge;
    the first adhesive pad being positioned within the top opening; and
    the first adhesive pad being superimposed onto the second base.

6. The portable device accessory as claimed in claim 4 comprising:
    the second adhesive pad being concentrically positioned about the bottom edge;
    the second adhesive pad being positioned within the bottom opening; and
    the second adhesive pad being superimposed onto the second base.

7. The portable device accessory as claimed in claim 1 comprising:
    the connector comprising a lateral wall, a top edge, and a second base;
    each of the plurality of protrusions comprising a structural body and at least one locking divot;
    the structural body being externally connected around the lateral wall;
    the structural body being positioned adjacent to the top edge;
    the structural body being radially distributed around the second base;
    the at least one locking divot traversing into the structural body; and
    the at least one locking divot being oriented toward the top edge.

8. The portable device accessory as claimed in claim 1 comprising:
    each of the plurality of hooks comprising at least one first protrusion;
    each of the plurality of protrusions comprising at least one locking divot; and
    the at least one locking divot and the at least one first protrusion being slidably engaged with each other.

* * * * *